March 8, 1960  A. L. FLATAU  2,927,815
BALE LIFTER

Filed Oct. 11, 1957  2 Sheets-Sheet 1

INVENTOR.
Alfred L. Flatau
BY

March 8, 1960

A. L. FLATAU 2,927,815

BALE LIFTER

Filed Oct. 11, 1957

INVENTOR.
ALFRED L. FLATAU
BY

United States Patent Office 2,927,815
Patented Mar. 8, 1960

2,927,815

BALE LIFTER

Alfred L. Flatau, Olympia, Wash.

Application October 11, 1957, Serial No. 689,628

3 Claims. (Cl. 294—76)

The instant invention relates to hoisting and elevating equipment used for handling bales of hay and the like and more particularly it is an object of this invention to provide a bale lifter having a rigid frame including a pair of spaced parallel bars having a vertically disposed structure whereby bales are retained on the bars by flexible members releasably secured to the lower end of the vertical structure and adjustably secured by snap fasteners to the upper end of said structure for retaining the load on said bars.

A further object is to provide a bale lifter having a vertically disposed sttructure which is adjustable for varying the load capacity of the bale lifter.

A further object is to provide a bale lifter having an adjustable vertical structure in combination with novel "take-up" means whereby tension of the flexible load retaining members is automatically adjusted.

Another object is to provide a bale lifter as described wherein the lower ends of the flexible members may be released by a trip rope or cable extended from latches connecting the ends of the flexible members to the lower end of the vertical structure to an operator on the floor or ground whereby the bales may be elevated by a rigid frame and readily released from the frame by pulling on a trip rope or the like from the floor or from the ground below.

A further object of the invention is to provide a bale lifter having a self-adjusting frame in combination with novel cable means wherein the load weight is employed to provide proper load gripping action of the flexible load retaining members.

Still another object of the invention is to provide improvements upon a previous bale lifter disclosed and described in my co-pending patent application titled "Bale Lifter," Serial No. 648,330, filed March 25, 1957.

The purpose of this invention is to provide a bale lifter which is so constructed that bales, such as bales of hay, may be elevated by a rigid frame and readily released from the frame by pulling on a trip rope or the like from a floor or from the ground below.

In the conventional method of transferring bales of hay from a wagon, or truck to a barn, the bales are carried by a sling, or secured on a platform by flexible elements, and with the bales elevated to high positions in large barns it is difficult to release the holding elements. Furthermore, where the slings are formed with ropes the weight of the bales on the ropes makes it difficult to draw the ropes from the bales.

The object of this invention is, therefore, to provide a bale carrying frame in which, upon the release of flexible holding elements, parts of the supporting structure drop away permitting the bales to tilt and fall from the frame.

It is yet another object of the invention to provide means for constructing a bale carrying frame whereby upon release of bale holding elements of the frame all bales on the frame drop instantly therefrom so that the frame may be taken immediately to a wagon or truck for reloading bales thereon.

A further object of the invention is to provide a bale lifter that is readily attached to a hook of a crane or hoist so that it may readily be conveyed from one point to another.

A still further object of the invention is to provide a frame for carrying bales of hay and the like in which the frame is of rugged construction, simple and economical of manufacture and efficient in operation.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
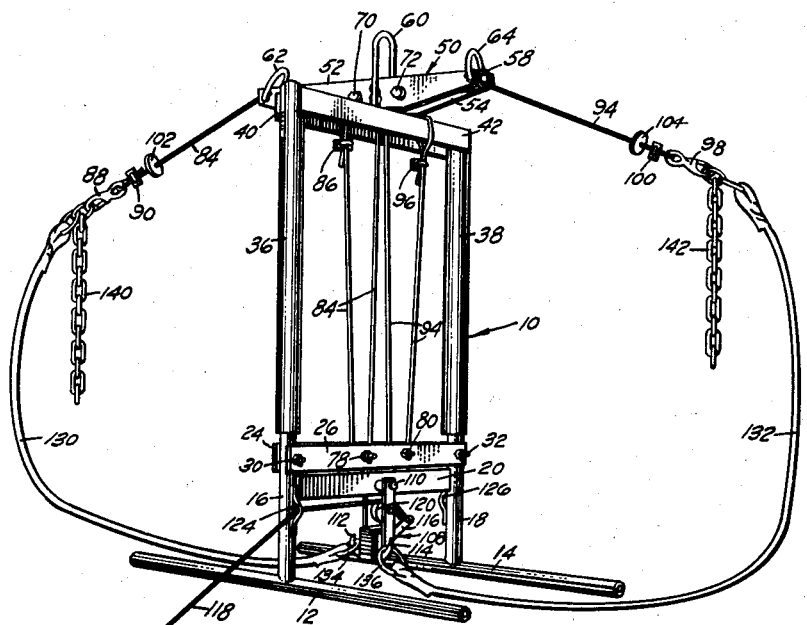
Figure 1 is a perspective view illustrating the construction and relative positions of the parts of the improved bale lifter of my invention.

While one embodiment of the invention is illustrated in the above-referred to drawing, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numerals 12 and 14 indicating a pair of spaced apart, horizontally disposed bars. Vertically disposed posts 16 and 18 are provided each having its lower end rigidly secured to a respective bar 12 or 14 intermediate the ends thereof.

The numeral 20 indicates an elongated horizontally disposed cross brace which connects the two upright posts 16 and 18. The brace 20 extends transversely of the axes of the bars 12 and 14, and is positioned with the ends secured to the posts 16 and 18, respectively, at points spaced equidistantly from the lower ends thereof. The cross brace 20 further serves to maintain the posts 16 and 18 and the bars 12 and 14 in spaced parallel relation.

A pair of elongated bars 24 and 26 are provided disposed above the cross brace 20. The bars 24 and 26 are positioned one on each side of the posts 16 and 18 and have their ends releasably secured to a respective post by means of bolts 30 and 32 which latter extend through holes provided in the ends of the bars and through transversely disposed apertures in a respective post 16 or 18.

A pair of elongated tubular members 36 and 38 are slidably received over the upper ends of the posts 16 and 18 in telescoping relation.

The upper ends of the tubular members are connected by a pair of elongated cross braces 40 and 42 disposed one on each side thereof and having their ends suitably secured thereto. A horizontally disposed cross arm, generally designated by the numeral 50, is provided secured to the cross braces 40 and 42 and extends transversely thereof. The cross arm 50 comprises a pair of elongated spaced apart side plates 52 and 54. The cross arm 50 is positioned intermediate the length of the cross braces 40 and 42 and extends equidistantly from either side thereof.

Short sections of tubing or pipe 56 and 58 are secured between the plates 52 and 54 at each end of the cross arm 50 being disposed longitudinally of the arm 50 and in horizontal alignment.

An upstanding inverted U-shaped hook 60 is secured to the cross arm 50 and is for receiving a hook of a block and tackle or other suitable hoisting equipment. Similar hooks 62 and 64 are secured one at each end of the arm 50 to facilitate the attachment of a three-rope carrier if desired.

A pair of pulleys 66 and 68 are also disposed between the plates 52 and 54 of the cross arm 50 being disposed in spaced apart horizontally aligned positions one on each side and adjacent the vertical axis of the arm 50. The pulleys 66 and 68 are rotatably mounted on pins or bolts 70 and 72 which extend transversely through the side plates 52 and 54.

Another pair of pulleys 74 and 76 are disposed between the cross bars 24 and 26 in spaced apart positions on either side of the vertical axis thereof. The pulleys 74 and 76 are rotatably mounted on pins or bolts 78 and 80 which extend transversely through the cross bars 24 and 26.

As thus described, it will be seen that the frame of the device comprises a lower load receiving portion and an upper portion telescopingly received thereon.

Novel means are provided for interconnecting the frame portions in operating relation which includes a length of cable 84 which has one end secured to the cross brace 40 being passed over the brace and having its free end secured to the standing part by a cable clamp 86. The cable 84 extends downwardly and around the pulley 74 of the pair disposed between cross bars 24 and 26 then upwardly between the cross braces 40 and 42 and is passed over the pulley 70 of the pair disposed between the side plates of the cross arm 50, then horizontally outwardly and through the pipe section 56 which serves as a cable guide.

The outer end of the cable 84 is passed through the eye of a snap-hook 88 and is secured by a cable clamp 90.

Another length of cable 94 is similarly arranged having one end secured to the cross brace 42 being passed over the brace and its free end secured to the standing part by a cable clamp 96. The cable 94 extends downwardly and around the pulley 76 then upwardly between the cross braces 40 and 42 passing over the pulley 68, mounted between the side plates 52 and 54 of the arm 50, and then outwardly through the pipe 58.

The outer end of the cable 94 is passed through the eye of a snap-hook 98 and is secured by a cable clamp 100.

Each of the cables 84 and 94 are provided with a disc-shaped stop member 102 and 104 respectively which is secured on the outer ends of cables in a position adjacent the respective clamp 90 and 100. The stop members 102 and 104 are adapted to abut the outer open ends of the cable guides 56 and 58 at times when the frame is in an extended position and prevent excessive telescoping of the posts 16 and 18 outwardly of the tubular members 36 and 38.

The bale lifter of my invention further includes a trip release mechanism generally indicated by the numeral 108 which may be of suitable conventional construction.

The trip 108 is mounted on the cross brace 20 by a transversely disposed bolt or pin 110. The trip mechanism 108 depends from the brace 20 and has a pair of outwardly extending latch hooks 112 and 114. The latch hooks 112 and 114 are actuated by a trip lever 116 which the operator may operate from a position on the ground or from a position away from the frame by means of a trip cord 118 which is attached to the outer end of the trip lever 116 and then extends over a pulley 120 disposed between the side members of the trip mechanism 108 rotatably mounted on a pin or bolt 122 which extends transversely through the side members. The trip cord 118 extends outwardly to the side of the frame through a cord guide or eye 124 which latter is secured to the post 16. A similar eye 126 is secured to the opposite post 18 should it be desired that the trip cord 118 be positioned to that side of the frame.

The lever 116 is pivotally mounted by a pin 115 in side plates 117 of the trip mechanism 108, and the lever 116 is provided with an arm 119 that snaps into notches 121 of the hooks 112 and 114 to retain the hooks in upper rope holding positions. Upon pulling on the cord 118 the arm 119 moves downwardly out of the notches 121 releasing the hooks 112 and 114 which drop downwardly by gravity releasing the ropes 130 and 132.

The bale lifter of this invention further includes a pair of flexible load retaining members such as lengths of rope 130 and 132 each of which has a D-ring 134 and 136 secured in the lower end thereof.

The D-rings 134 and 136 may be engaged in a respective latch hook 112 and 114 whereby the lower ends of the ropes 130 and 132 are releasably secured to the trip 108.

The upper or outer ends of the ropes 130 and 132 are secured in an end link of a pair of chains 140 and 142 which are of substantial length. The snap-hooks 88 and 98 may be engaged in a selected link of the respective chains 140 and 142 when the load retaining assemblies are disposed about bales.

Figures 2, 3:
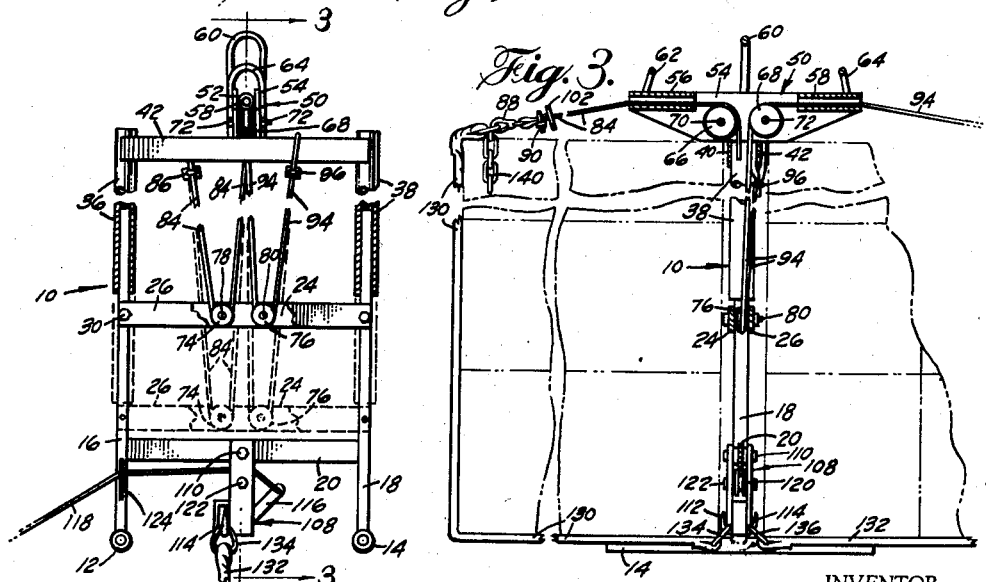
Figure 2 is a side elevation of the bale lifter, on a reduced scale with some parts broken away and some parts shown in section for clarity of illustration.
Figure 3 is a view in cross section taken along the line 3—3 of Figure 2, having some parts broken away for convenience of illustration.
Figure 4:
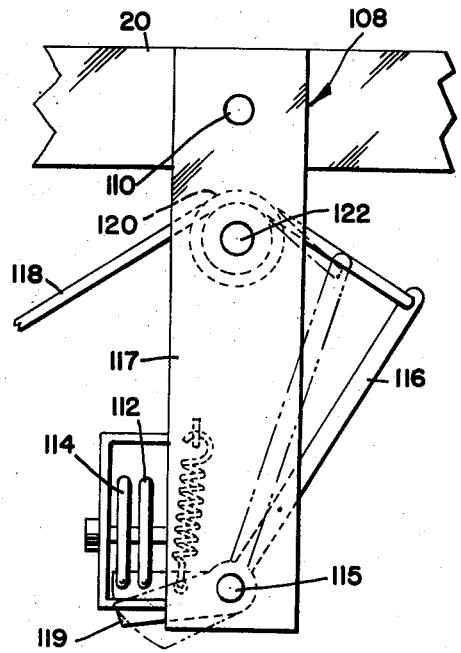
Figure 4 is a side elevational view illustrating the latch for locking the rope holding hooks in the position of holding the ropes, with the parts shown on an enlarged scale.
Figure 5:
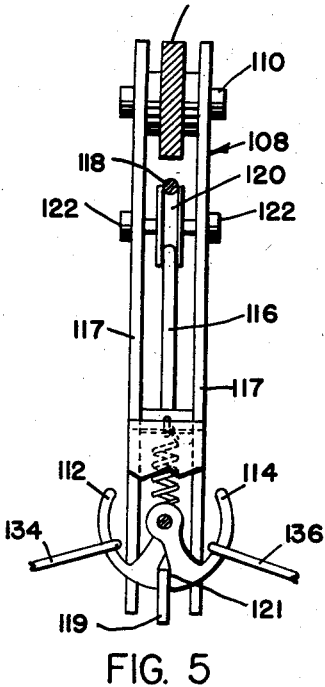
Figure 5 is an end elevational view of the latch shown in Figure 4.

As described above, the cross bars 24 and 26 are releasably connected to the posts 16 and 18 so that they may be moved to an upper position as illustrated in Figures 2 and 3 whereby the extensibility of the frame is increased allowing for a greater load capacity.

*Operation*

The bale lifter is in loading position with the ropes 130 and 132 extended whereby the lower ends are secured in the latch hooks 112 and 114 of the trip mechanism 108 and with the snap-fasteners 88 and 98 released from the chains 140 and 142. Bales such as bales of hay, are positioned transversely on the bars 12 and 14 and the ropes are drawn over the bales as shown in Fig. 3. The snap fasteners 88 and 98 are secured in a selected link of the chains 140 and 142 and with the hook 60 secured to a hoist or the like, the bale lifter, with the bales thereon, is elevated to an upper position in a mow of a barn or the like.

It will be seen that the load bears directly upon the bars 12 and 14 and that the lift is on the telescoping upper frame whereby the novel cable arrangement interconnecting the telescoping frame sections will cause the flexible load retaining members to be cinched up tight about the bales.

With the bales in the desired position the trip cord 118 is pulled whereby the latch hooks 112 and 114 of the trip 108 release the ends of the ropes 130 and 132 so that with the supporting means dropped away, the bales are unbalanced and will immediately drop downwardly into desired positions. The lifter is free to return for another load as soon as the bales drop therefrom and in the return movement the telescoping frame will be extended whereby the cable stops 100 and 102 abut the openings of the cable guides 56 and 58 and the ropes 130 and 132 hang from the snap fasteners at the outer ends of the cables 84 and 94.

From the foregoing description, it is thought to be obvious that a bale lifter constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A bale lifter comprising a pair of parallel bars positioned in spaced relation in a horizontally disposed plane, spaced vertically disposed posts extended upwardly from intermediate parts of the parallel bars, telescoping tubular members positioned on upper ends of the posts, a brace extended between and connecting lower ends of the posts, lower horizontally disposed bars adjustably mounted on the posts, upper horizontally disposed bars connecting upper ends of the tubular members, a cross arm mounted on and extended transversely of said upper horizontally disposed bars, spaced pulleys rotatably mounted on the lower horizontally disposed bars, spaced pulleys rotatably mounted in said cross arm, cables secured to the upper horizontally disposed bars, trained over the pulleys in the lower horizontally disposed bars, also trained over the pulleys in the cross arm, and extended from ends of the cross arm, a trip mechanism having hooks extended from opposite sides thereof mounted on the lower horizontally disposed bars, ropes freely held on said hooks and positioned to extend over bales on the parallel bars, and means for actuating the hooks to release the ropes the opposite ends of which are connected to the cables extended from the ends of the cross arm, whereby bales on the parallel bars are released.

2. A bale lifter as described in claim 1, wherein the ropes are connected to ends of the cables extended from ends of the cross arm by chains providing adjustment in said connections.

3. A bale lifter as described in claim 1, in which a U-shaped hook is provided on the cross arm.

No references cited.